M. SMITH.
KINEMATOGRAPHIC APPARATUS.
APPLICATION FILED APR. 6, 1910.
1,105,163.
Patented July 28, 1914.
3 SHEETS—SHEET 2.
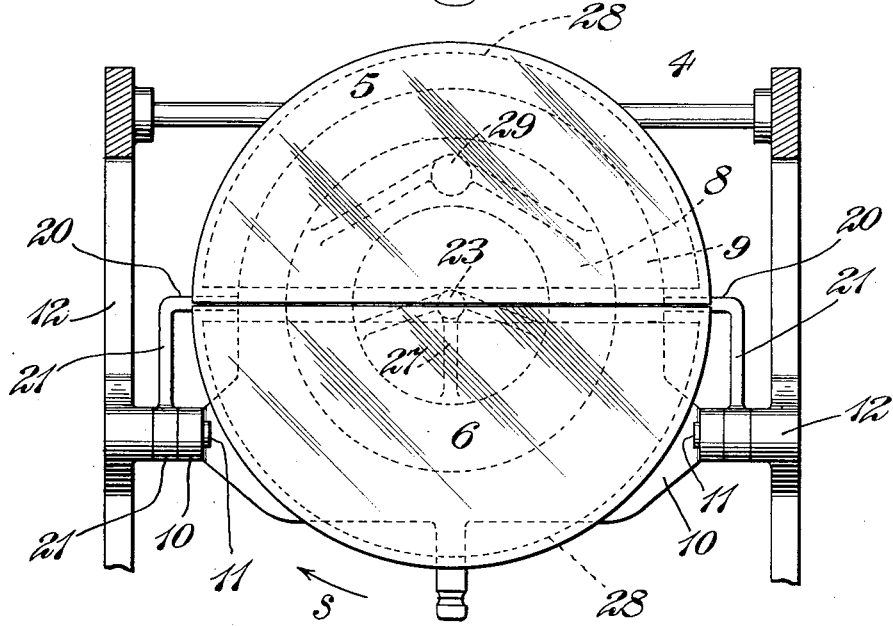
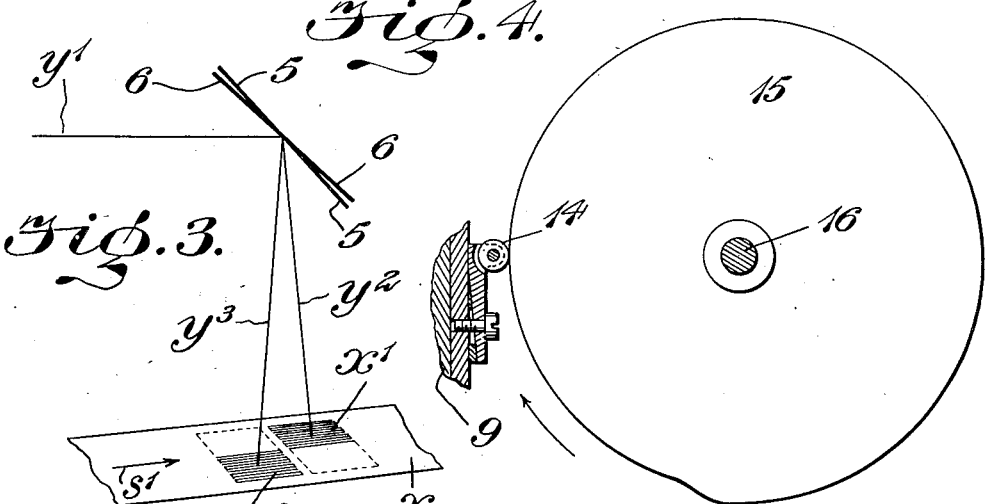
INVENTOR
Magnus Smith M. SMITH.
KINEMATOGRAPHIC APPARATUS.
APPLICATION FILED APR. 6, 1910.
1,105,163.
Patented July 28, 1914.
3 SHEETS—SHEET 3.
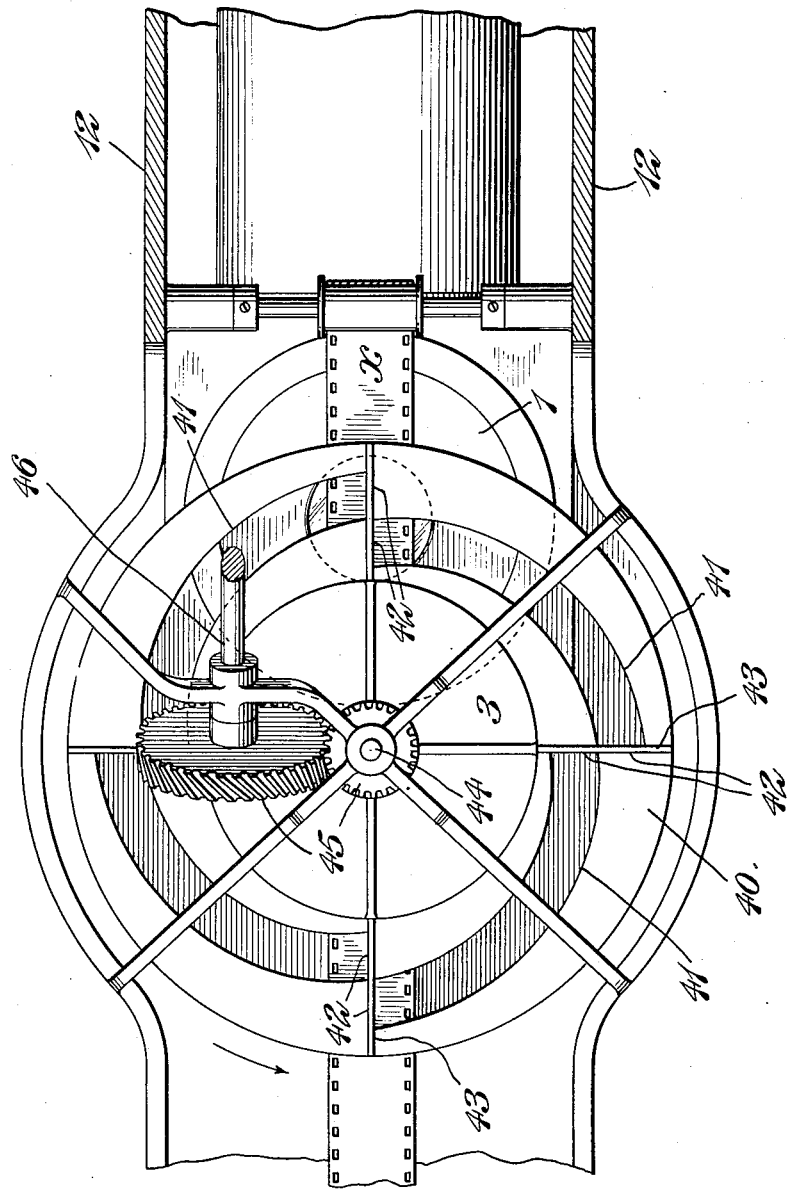
WITNESSES
A. C. Abbott
K. R. Markey
INVENTOR
Magnus Smith
BY
ATTORNEY

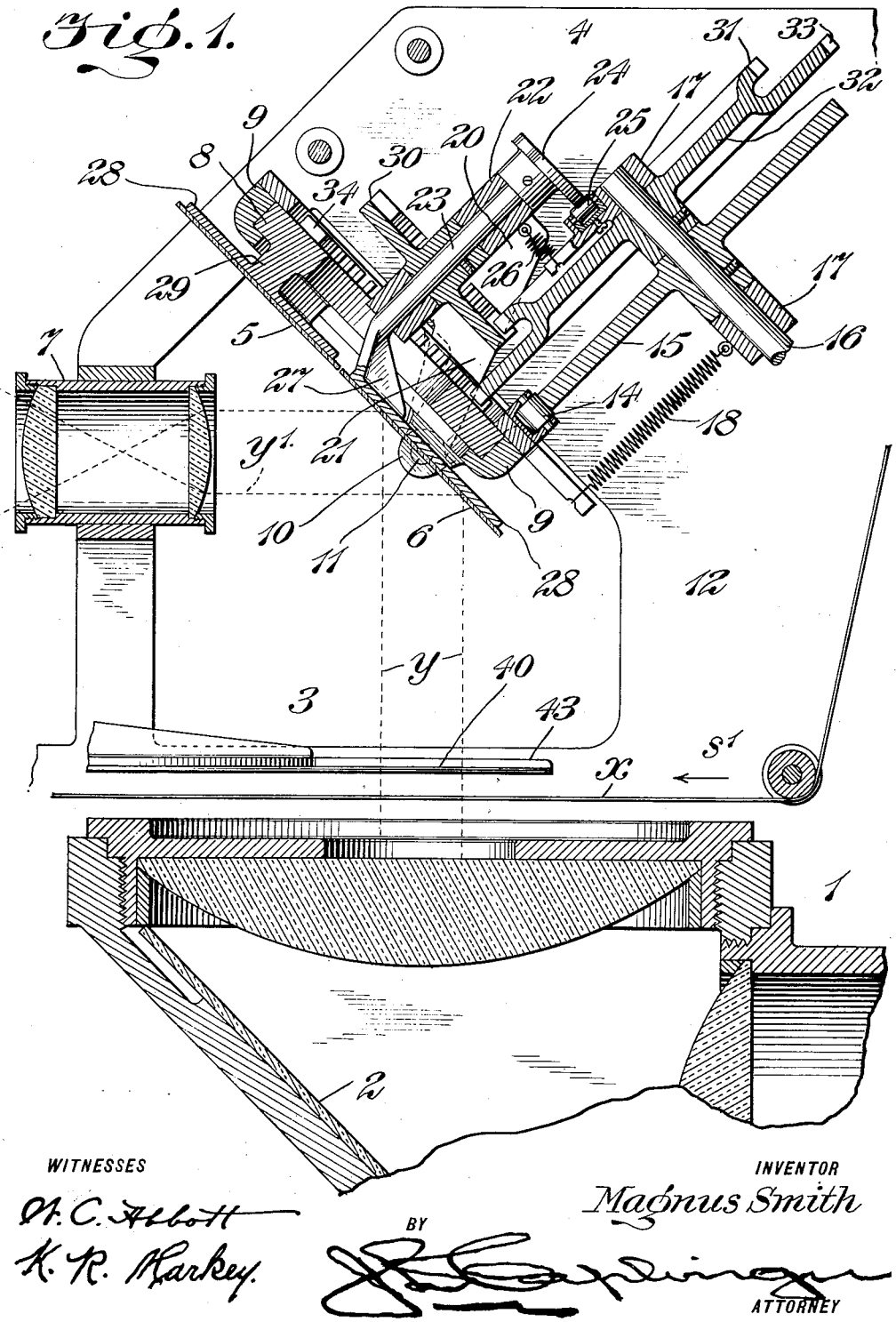

UNITED STATES PATENT OFFICE.

MAGNUS SMITH, OF NEW YORK, N. Y., ASSIGNOR, BY MESNE ASSIGNMENTS, TO CONTINENTAL MOTION PICTURE COMPANY, INC.

KINEMATOGRAPHIC APPARATUS.

1,105,163.         Specification of Letters Patent.         Patented July 28, 1914.

Application filed April 6, 1910. Serial No. 553,805.

*To all whom it may concern:*

Be it known that I, MAGNUS SMITH, a British subject, residing in the city and State of New York, have invented certain Improvements in Kinematographic Apparatus, of which the following is a specification.

This invention relates to certain improvements in that class of kinematographic apparatuses which are especially designed and adapted for exhibiting motion pictures, and the object of the invention is to provide an apparatus of this general character of a simple and comparatively inexpensive nature, having certain features of novelty and improvement whereby such pictures may be more accurately and effectively portrayed or exhibited, and whereby inadvertent and undesirable shifting movement or vibration of such pictures, such as is commonly present in the operation of similar apparatuses heretofore designed, is materially lessened and avoided, so that a heightened illusory effect may be attained.

The invention consists in an apparatus of this general character having a plurality of reflecting devices movable successively into the light beam and capable of interchangeable operation to reflect independent images, wherein means are provided for so operating and interchanging such reflecting devices as to permit consecutive use thereof in the portrayal or exhibition of motion pictures in a substantially continuous series.

The invention also consists in an apparatus of this character wherein the reflecting devices are so constructed and arranged as to permit of being successively moved into the light beam and consecutively used for the portrayal or exhibition of images upon a single film in a substantially continuous series, whereby the use of more than one film during such portrayal or exhibition may be dispensed with.

The invention also consists in a kinematographic projecting apparatus wherein a single source of light is employed in connection with a plurality of interchangeable reflecting devices movable successively into the light beam during the exhibition of the motion pictures, and wherein such reflecting devices are so actuated relatively one to the other as to permit of converging the reflected images produced from such source of light at the same point in such manner that the images projected from one reflecting device may be dissolved and merged with those projected from the other reflecting device.

The invention also consists in a kinematographic apparatus having a plurality of reflecting devices movable successively into the light beam and capable of conjoint operation with a single picture film, wherein means are provided for continuously driving such film and for so operating the respective reflecting devices during such movement of said film as to permit the successive pictures or images upon the film to be merged or dissolved one into another during projection, in such a manner as to produce a substantially continuous and uniform motion picture.

The invention also consists in an apparatus of this general character wherein the angle of each reflecting device, during its use in reflecting the pictures upon the film, is varied to compensate for the motion of the film, and wherein the reflecting devices are movable successively into the light beam and are alternately thrown out of operative position, and while so remaining, are angularly adjusted in such a way as to permit of renewed use for reflecting other portions of the moving film.

The invention also contemplates certain novel features of the construction, and combinations and arrangements of the several parts of the improved kinematographic projecting apparatus, whereby certain important advantages are attained, and the apparatus is rendered simpler, less expensive, and otherwise better adapted and more convenient for use, all as will be hereinafter fully set forth.

The novel features of the invention will be carefully defined in the claims.

In order that my improvements may be the better understood, I will now proceed to describe the same with reference to the accompanying drawings, wherein—

Figure 1 is a fragmentary sectional view showing one embodiment of my improved kinematographic apparatus especially designed and adapted for use in the exhibition of motion pictures; Fig. 2 is a face view showing the mirrors or reflecting devices employed in the structure disclosed in Fig. 1; Fig. 3 is a diagraphic view illustrating certain features of the operation of the apparatus which will be hereinafter explained; Fig. 4 is a fragmentary detached detail view illustrating certain features of the cam controlling means which will be hereinafter described; Fig. 5 is a fragmentary sectional plan view illustrating the construction and arrangement of the shutter in the construction shown in Fig. 1.

Referring first to Figs. 1 to 5, inclusive, 1 represents a condenser such as is commonly provided for use in moving picture machines, having an inclined reflecting surface 2 from which a beam of light from any appropriate source is thrown upwardly, as indicated at $y$ in Fig. 1, through a continuously driven film $x$ whereon is produced a series of images consecutively arranged as is customary in moving picture films, and 3 represents a shutter located above said film and driven in unison therewith and capable of operation to permit the passage of only so much of the beam as will correspond substantially to the width of a single image upon the film, measured in the direction of travel thereof, except at such times as one image is being merged or dissolved into the succeeding image upon said film, at which times said shutter permits the passage of a sufficient part of the beam for the projection of complementary parts of two succeeding images of said film as will be hereinafter explained. The upwardly directed beam $y$ controlled by the shutter 3 as above described is received in the structure herein shown by means, indicated as a whole at 4, comprising two mirrors 5 and 6, or equivalent reflecting devices and actuating and controlling means therefor, capable of operation to project the beam received upon said mirrors or other reflecting devices 5 and 6 through a lens 7, whence the enlarged projection is received upon a screen as is usual in the exhibition of motion pictures. The reflecting devices 5 and 6 are so actuated and controlled during the use of the apparatus, as to compensate for the movement of the continuously driven film $x$ in order that the images thereof may appear stationary upon the screen when projected, and to correlate parts of adjacent images of the film at the times when one such image is being dissolved and merged in a succeeding image and simultaneously with such compensatory operation.

It will be apparent that the special structure and arrangement of the lens 7 and condenser 1 are immaterial to my present invention, and may be varied at will. For example, the condenser may obviously be arranged to throw the beam $y$ at other angles than that herein shown, and the lens 7 may be arranged with good results between the condenser and the reflecting devices of the compensating means 4.

The mirror reflecting devices 5 and 6, as herein shown, are constructed with plane semi-circular reflecting surfaces, which are fitted together with their diametrical edges as closely adjacent as possible in circular arrangement, as clearly seen in Fig. 2, and each mirror is securely held upon a substantial metal plate 28, extended flush across its rear surface and adapted to impart such rigidity as may be necessary to prevent undue vibration of the reflecting surfaces during the use of the apparatus embodying my improvements. The mirror reflecting device 5 has its backing plate 28 rigidly held by a stem 29 upon a rotary bearing member 8 of annular formation, the marginal portions whereof are engaged for rotary movement in an internally grooved supporting member 9 of annular form which, as clearly shown in Figs. 1 and 2, is provided at opposite sides of its lower part with divergent angular perforated lugs 10, 10, engaged for pivotal movement upon alined horizontally extended spaced pins or studs 11, 11, projecting from the spaced frame members 12, 12 of the machine, the structure and arrangement of these parts being such that said grooved supporting member 9 is adapted for pivotal movement upon said pins or studs 11, 11 simultaneously with the rotatory movement of the bearing ring or member 8 within it, so that the mirror 5 may be variably tilted to compensate for the travel of the film during its operation in reflecting the individual images thereof and coincidently with its transitional rotatory movement which serves to interchange the mirror 6 therewith for such reflecting operation.

14 represents an anti-friction roller adjustably held upon the rear surface of the member 9 in position for engagement with the perimetral surface of a cam 15 held upon a driven shaft 16 supported in bearings 17 upon the frame of the machine, said shaft 16 being driven in unison with the movement of the picture film $x$, so that its cam 15 may operate to variably incline said member 9, together with the member 8 and mirror 5 carried thereby, in such a manner as may be necessary or desirable to assist in compensating for the travel of the film $x$ as above set forth. A spring 18 connected with the supporting member 9 operates by its tension to hold the roller 14 securely upon the perimental cam surface of said cam 15 so as to compel accurate movement of said member, and mirror 5 supported thereby in conformity with the cam surface. The roller 14 is shown in Fig. 4 as mounted in a bracket 14ᵃ adjustable along an inclined surface of the member 9, so that the normal position of the mirror 5 may be varied at will.

20 represents an auxiliary supporting member, herein shown as made in yoke-like form with divergent angular arms 21, 21, which are spaced apart and are also pivotally supported upon the pins or studs 11, 11 of the frame members 12, 12, so as to permit pivotal movement of such auxiliary supporting member 20 concentrically with relation to the pivotal axis of the supporting member 9 for mirror 5. This auxiliary supporting member 20 is provided with alined bearings 22 at its central part, in which bearings is held for rotatory movement an auxiliary bearing member or shaft 23, the forward extremity whereof is bent and flattened as shown at 27 in Figs. 1 and 2, so as to afford an integral connection with the bearing plate 28 whereon the mirror reflecting device 6 is held, and 24 represents a cam secured upon the rear end of said auxiliary bearing member or shaft 23 and having a perimetral cam surface engaged with an anti-friction roller 25 adjustably supported upon one of the bearings 17 for the shaft 16, whereby it will be seen that rotatory movement imparted to said shaft or member 23 by means to be hereinafter explained is caused to operate through said cam 24 to variably incline said member 23, together with its supporting member 20 and the mirror 6 in such a manner as may be necessary or desirable to compensate for the travel of the film $x$ during the operation of such mirror 6 in projecting the images upon said film. A spring 26 affords a resilient connection from the auxiliary supporting member 20 to the bearing 17 whereon the roller 25 is supported, and operates similarly to the spring 18 to retain the cam surface of cam 24 in accurate contact upon said anti-friction roller.

30 represents a crown gear wheel held upon the auxiliary bearing member or shaft 23 and having its gear surface in mesh with the annular gear surface 31 of a gear wheel 32 carried by the driven shaft 16, the construction and arrangement of these intermeshing gear surfaces being such that continuous rotatory movement is imparted from shaft 16 to said auxiliary bearing member or shaft 23 irrespective of the vibratory movement of said member around the pivot pins or studs 11 11 incident to the operation of cam 24 as above set forth, and upon said gear wheel 32 is also produced a larger annular gear surface 33 intermeshing with a crown gear surface 34 produced upon the rear surface of the annular bearing member 8, whereby it will be seen that this member 8 is also continuously driven despite its vibratory movement upon pins 11 due to the operation of cam 15.

The intermeshing gear surfaces above described for continuously driving the bearing members 8 and 23 are so proportioned and arranged that said members are driven at equal axial velocities, whereby it will be seen that the semi-circular mirrors 5 and 6 carried upon them are alternately moved into and out of line with the beam of light thrown upwardly from the condenser 1, as indicated at $y$, so that these mirrors being set at inclinations, as shown in Fig. 1, are caused to operate alternately to reflect such beam in a lateral or horizontal direction as indicated at $y^1$ to and through the lens 7, and thence to the screen or other surface whereon the consecutive images of the picture film $x$ are to be exhibited. During such alternate operation of said mirrors 5 and 6 in reflecting the images of the picture film, the cams 15 and 24 will operate as above set forth to compensate for the travel of the picture film, the direction of movement of the rotatory mirrors 5 and 6, as indicated at $s$ in Fig. 2, being transverse to the travel of the film as indicated at $s^1$ in Fig. 1, while the compensatory movement of each of such mirrors independently of the other under the influence of said cams 15 and 24, is in the direction toward the lens 7, whereby it will be evident that when either of the mirrors 5 and 6 is in reflecting position exclusively, a single image of the picture film during its travel across the condenser will be projected from the lens 7 and caused to appear in a stationary position upon the exhibiting screen. In this manner the necessity for stopping the picture film from movement during projection of the consecutive images thereof is altogether dispensed with and a material advantage is attained by reason of the lessened liability of damage to the film due to the strains imposed thereupon in starting and stopping and also by reason of the elimination of vibration or shifting of the images upon the screen such as commonly occurs in kinematographic apparatus of the ordinary constructions.

The mirrors 5 and 6 being alternately carried out of alinement with the beam from the condenser during their rotatory movement, and being consequently thrown out of reflecting position, I so construct and arrange the cam controlling and actuating devices therefor as to assure the return of each mirror 5 or 6 during such time as it is thus carried out of reflecting position, into such an inclined relation as will fit it for renewed operation for reflecting a succeeding image of the picture film when, in the further rotation of such mirror, it shall again arrive in reflecting position. In this manner, as the two mirrors 5 and 6, during their rotatory movement, are jointly interposed in line with the beam from the condenser, they will be adjusted at such relatively different inclinations thereto as may be necessary or desirable for permitting them, respectively, to reflect complementary portions of two adjacent or consecutive images upon the picture film $x$, and having been thus adjusted prior to their arrival in position for joint reflecting operation, their inclinations may be varied by the operation of the cam controlling and actuating means above referred to in such manner as will compensate for the travel of the picture film, and permit one of such mirrors to be moved in a gradually increasing manner into reflecting operation inversely to the gradually lessening reflecting operation of the mirror which is nearing the limit of its movement.

The angular relation wherein the mirrors are adjusted prior to their joint reflecting operation, as well as their joint operation in reflecting complementary parts of adjacent or consecutive images upon the picture film is represented diagraphically in Fig. 3, wherein the mirror 6 is shown in such position as will assure its operation in reflecting the image $x^1$ of film $x$ while the mirror 5 which presumably is being substituted for such mirror 6 is at such relative inclination thereto as will assure its operation in reflecting the succeeding image $x^2$ of the picture film.

The mirrors 5 and 6 being of the structure and arrangement shown, it will be evident that, during such joint reflecting operation of the mirrors, the joint or break between their adjacent diametrically extended edges will operate, during its traversal of the beam from the condenser to confine the reflecting operation of the respective mirrors to substantially complementary parts of the two adjacent or consecutive images $x^1$ and $x^2$ of the picture film, as represented by the shaded surfaces in Fig. 3.

In order to prevent shifting of the images beyond the limits of the screen, such as might otherwise occur during the interchange of the mirrors, I have shown the apparatus provided with the shutter 3 interposed between the condenser and the interchangeable mirrors 5 and 6, although I do not desire to be understood as limiting myself to the employment of such shutter, nor to the particular character of shutter herein illustrated in cases where the employment of a shutter for this purpose is desirable.

As shown in the accompanying drawings, this shutter 3 is constructed in the form of a flattened circular plate or disk 40 which may be formed conveniently from thin sheet metal or the like having produced in it a plurality of eccentrically curved slotted openings 41, 41 adapted, during rotatory movement of said plate or disk, to traverse the traveling picture film $x$ from side to side, each such opening 41 being of a width substantially equal to that of an individual image measured in the direction of movement of the film, and being so curved with respect to the axis of rotation of the shutter as to compensate for the travel of the film, so that the beam thrown upward from the condenser to the interchangeable mirrors 5 and 6 through each such opening 41 may be confined substantially to the width of the image which is retained in stationary relation to such opening 41 during the travel of the picture film across the condenser by reason of the compensating function of the eccentric curvature of such opening.

The termination of each opening 41 as herein shown, is in line, radially of the plate or disk 40, with the forward end of the succeeding opening 41, as clearly shown at 42 in Fig. 5, whereby it will be seen that during the joint operation of the mirrors 5 and 6 above referred to in reflecting complementary parts of two adjacent or consecutive images of the picture film, these complementary parts of such adjacent or consecutive images will be projected from the condenser, the one through the rear end of the forward opening 41 of the shutter, and the other through the forward end of the succeeding opening 41 of such shutter. Since the openings 41 when formed as shown in Fig. 5 may tend to reduce the strength of the metal from which the shutter 3 is produced, I have illustrated said shutter provided with thin radial ribs 43, 43 extended between the adjacent ends of the said shutter openings. It will be evident, however, that the shutter may be produced from glass, in which case the openings 41, 41 may be produced in an opaque coating extended over the surface of the glass plate, thereby avoiding weakening of the same. The employment of such a plate may also be of advantage by reason of its refraction for affording parallelism of the rays from the condenser to the mirrors in such a manner as to permit spacing of these mirrors at a greater distance from the condenser, if this be desired. The employment of such a plate may also be of advantage, where the rays from the condenser would ordinarily converge toward the mirrors, by reason of its refraction for affording parallelism of the rays from the condenser to the mirrors in such a manner as to permit spacing of these mirrors at a greater distance from the condenser, if this be desired.

As herein shown, the shutter 3 is mounted upon a vertically extended shaft 44, journaled upon the frame of the machine and driven at an appropriate speed by means of intermeshing skew gears 45 from a shaft 46 operating in unison with the means for driving the film and for controllably actuating the mirrors 5 and 6. Since these driving connections may be of any desired nature, I have not deemed it necessary to illustrate them in detail herein.

I do not claim herein the shutter mechanism above described as this mechanism is claimed in my co-pending application Serial No. 820,051 filed February 20th, 1914, which is a division of this application.

The pivotal axis at the pins or studs 11 whereon the mirrors 5 and 6 and their bearing members 8 and 23 vibrate or oscillate during their variable tilting adjustment are alined with the reflecting surfaces of said mirrors when the same are in position for reflecting operation and are also in alinement with the beam thrown upwardly from the condenser whereby it will be seen that the reflected beam $y^1$ will be maintained in parallelism with the axis of the projecting lens 7 despite the tilting adjustment of such mirrors so that the projecting apparatus may be located at any desired or convenient distance from the exhibiting screen without liability of shifting the projected images over the same during projection.

From the above description of my improvements, it will be evident that the apparatus constructed according to my invention is of an extremely simple and comparatively inexpensive nature and is particularly well adapted for use by reason of the possibility of obviating shifting or vibration of the images during projection and of the security against damage to the picture films afforded by its employment and it will also be obvious from the above description that the apparatus is susceptible of considerable change without material departure from the principles and spirit of the invention and for this reason I do not desire to be understood as limiting myself to the precise form and arrangement of the parts herein set forth in carrying out my invention in practise. For example, it will be obvious that the gearing herein illustrated for continuously revolving the interchangeable mirrors while permitting compensatory adjustment thereof, are in substance, universal driving connections, and while the gearing herein shown is well adapted for the apparatus to which it is applied, it will be obvious that many other forms of universal driving connections and joints may be substituted in lieu thereof without departure from the invention.

Having thus described my invention, what I claim and desire to secure by Letters Patent is—

1. In a projecting apparatus having means for continuously moving a picture film through a beam of light, a plurality of reflectors adapted to be interchangeably positioned to move in one direction through said light beam, to receive and reflect the picture rays, means for moving said reflectors and means for rocking each reflector to continuously change its angular position with respect to an adjacent reflector and with respect to the film while entering and passing through the beam of light from said film, to cause the image of one picture to fade into the next.

2. In a projecting apparatus having means for continuously moving a picture film through a beam of light, a plurality of reflectors adapted to be interchangeably positioned to move in one direction through said light beam, to receive and reflect the picture rays, means for moving said reflectors and means for rocking each reflector to cause it to enter said beam of light at an angle and continue to change its angular position with respect to an adjacent reflector and with respect to the film while traveling through said beam of light, to compensate for the movement of said film.

3. In a projecting apparatus having means for moving a picture film through a beam of light, a plurality of reflectors adapted to interchangeably move through said light beam, to receive and reflect the light rays, means for moving said reflectors and means for rocking each reflector to continuously change its angular position with respect to the film while moving through said beam of light.

4. In a projecting apparatus having means for moving a picture film through a beam of light, a plurality of reflectors adapted to interchangeably move through said light beam, to receive and reflect the picture rays, means for moving said reflectors and means for rocking each reflector to continuously change its angular position with respect to an adjacent reflector and with respect to the film while both of said reflectors are passing through the beam of light from said film.

5. In a projecting apparatus having means for moving a picture film through a beam of light, a plurality of reflectors adapted to interchangeably move through said light beam, to receive and reflect the picture rays, means for moving said reflectors and means for rocking each reflector to cause it to enter said beam of light at an angle and continue to change its angular position with respect to an adjacent reflector and with respect to the film while traveling through said beam of light.

6. In a projecting apparatus having means for continuously moving a picture film through a beam of light, a plurality of reflectors adapted to interchangeably move through said light beam, to receive and reflect the light rays, means for moving said reflectors and means for rocking each reflector upon a common fixed axis while moving through the beam of light to continuously change its angular position with respect to the film during the reflecting period.

7. An apparatus of the character described having means for continuously moving a picture film, a plurality of rotary reflecting devices adapted to be interchangeably positioned in the path of a beam of light from said film, and each adapted for rocking movement when so positioned, to compensate for the movement of said film, means for simultaneously rotating such reflecting devices, and means for imparting rocking movement to each of said reflecting devices.

In witness whereof I have hereunto signed my name in the presence of two subscribing witnesses.

MAGNUS SMITH.

Witnesses:
J. L. CAPLINGER,
W. C. C. LAWSON.

---

Corrections in Letters Patent No. 1,105,163.

It is hereby certified that in Letters Patent No. 1,105,163, granted July 28, 1914, upon the application of Magnus Smith, of New York, N. Y., for an improvement in "Kinematographic Apparatus," errors appear in the printed specification requiring correction as follows: Page 2, line 123, for the word "perimental" read *perimetral;* page 4, strike out the sentence beginning with the words "The employment," line 103, and concluding with the word "desired.", line 110; and that the said Letters Patent should be read with these corrections therein that the same may conform to the record of the case in the Patent Office.

Signed and sealed this 27th day of April, A. D., 1915.

[SEAL.]

J. T. NEWTON,
*Acting Commissioner of Patents.*